(12) United States Patent
Suddreth et al.

(10) Patent No.: US 11,750,930 B1
(45) Date of Patent: Sep. 5, 2023

(54) PANORAMIC VISION SYSTEM WITH PARALLAX MITIGATION

(71) Applicant: HONEYWELL INTERNATIONAL INC., Charlotte, NC (US)

(72) Inventors: John G. Suddreth, Phoenix, AZ (US); Kenneth M. Leiphon, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/655,192

(22) Filed: Mar. 17, 2022

(51) Int. Cl.
*H04N 23/698* (2023.01)
*H04N 23/63* (2023.01)

(52) U.S. Cl.
CPC ......... *H04N 23/698* (2023.01); *H04N 23/632* (2023.01)

(58) Field of Classification Search
CPC ............................ H04N 23/698; H04N 23/632
See application file for complete search history.

(56) References Cited

U.S. PATENT DOCUMENTS

| | | | |
|---|---|---|---|
| 7,148,861 B2* | 12/2006 | Yelton | G06T 15/205 345/418 |
| 7,619,626 B2* | 11/2009 | Bernier | G06T 15/205 345/639 |
| 9,686,479 B2 | 6/2017 | Marks et al. | |
| 10,582,181 B2 | 3/2020 | Leiphon et al. | |
| 10,645,369 B2 | 5/2020 | Gronholm et al. | |
| 10,659,773 B2 | 5/2020 | Briggs et al. | |
| 10,692,186 B1 | 6/2020 | Mercier et al. | |
| 11,128,812 B2 | 9/2021 | Christensen et al. | |
| 2017/0118458 A1 | 4/2017 | Gronholm et al. | |
| 2020/0021790 A1 | 1/2020 | Cook | |
| 2021/0349528 A1 | 11/2021 | Son et al. | |

FOREIGN PATENT DOCUMENTS

| | | |
|---|---|---|
| JP | 2019-101563 A | 6/2019 |
| WO | 2015013311 A1 | 1/2015 |

* cited by examiner

*Primary Examiner* — Kathleen V Nguyen
(74) *Attorney, Agent, or Firm* — Lorenz & Kopf LLP

(57) ABSTRACT

A panoramic image system with parallax mitigation includes a controller that can generate on a display an IFOV that includes image data from both a first image sensor having a first FOV and a second image sensor having a second FOV which are overlapping FOVs. The IFOV includes a portion of the non-overlapping section of a first FOV, the overlapping sections of both the first and second FOVs, and a portion of the non-overlapping section of the second FOV. The overlapping section of the first FOV is blended with the overlapping section of the second FOV, wherein the first FOV and the second FOV both have a level of contribution to the blended overlapping section. The level of contribution to the blending from the first FOV increases as the viewer's head moves in a first angular direction and decreases as the viewer's head moves in a second angular direction.

20 Claims, 5 Drawing Sheets

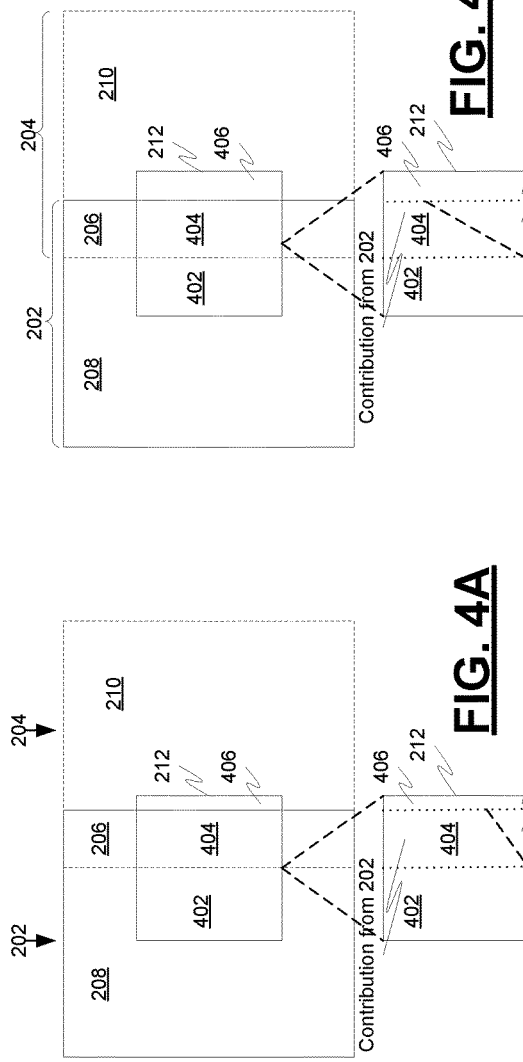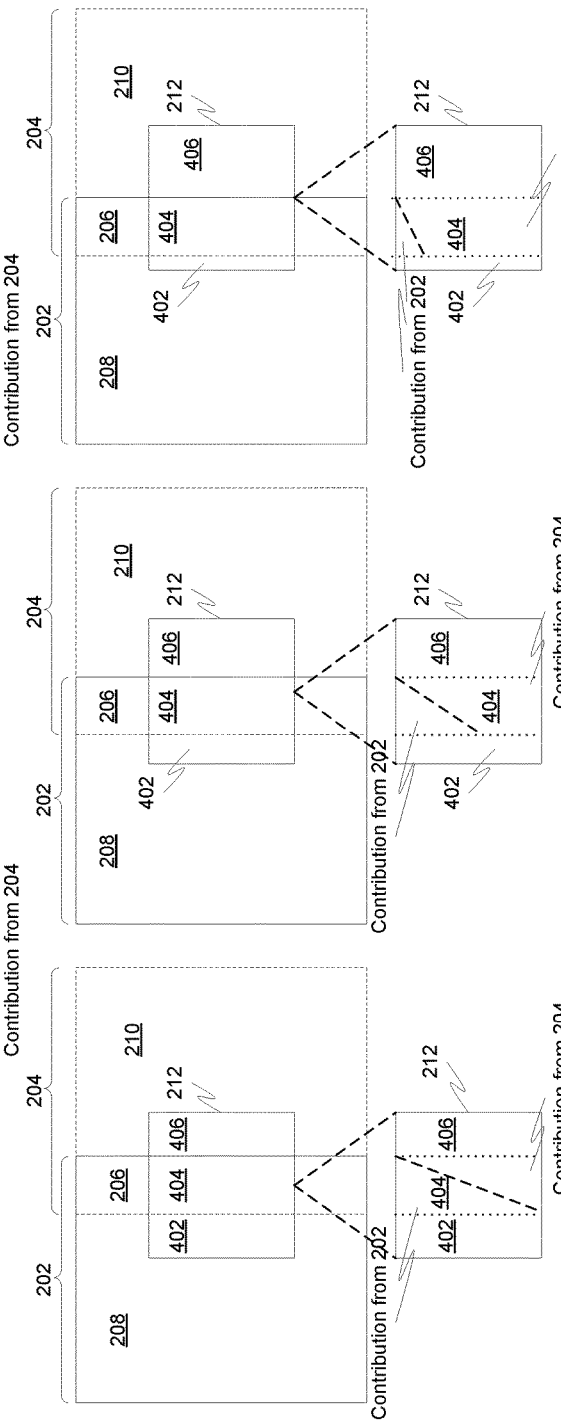

PANORAMIC VISION SYSTEM WITH PARALLAX MITIGATION

TECHNICAL FIELD

Embodiments of the subject matter described herein relate generally to panoramic vision systems, and more particularly to a panoramic vision system with parallax mitigation.

BACKGROUND

Various techniques are known for extending the field of view (FOV) of a camera. One technique is to mount a plurality of cameras on a circular or semi-circular mount structure to implement what is sometimes referred to as a camera ring. A camera ring allows for a panoramic view with much less "fish-eye" distortion and higher resolution than a single camera. With a camera ring, the individual cameras each produce images that overlap, and the overlapping images are then stitched together to produce a single, expanded FOV image.

Various techniques are also used to implement the image stitching. The most accurate technique is to generate depth fields and then apply the video images captured by the cameras as textures overlaying the depth fields. Although this technique is fairly accurate, the processing time associated with generating the depth fields results in excessive latency for real-time applications, such as a being driven vehicle with indirect vision.

As may be appreciated, when implementing a camera ring, a technique is also used to transition between the cameras. One relatively simple technique is to simply switch between cameras at about the center of the angle between the two cameras. This has the advantage of low latency but causes a rather pronounced "jump" in the scene due to parallax difference.

Hence, it is desirable to provide a system and method for transitioning between cameras on a camera ring that eliminates, or at least significantly mitigates, parallax differences, and that does not rely on processing techniques that exhibit relatively excessive latency. Furthermore, other desirable features and characteristics of the present invention will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a panoramic image system with parallax mitigation is disclosed. The system includes a plurality of image sensors for providing image data and a head tracker configured to supply an azimuth position signal and an elevation position signal representative of an angular position of a viewer's head, wherein the azimuth position signal corresponds to an azimuth angle and the elevation position signal corresponds to an elevation angle. The system further includes a display configured to selectively display images sensed by the image sensors in an instantaneous field of view (IFOV) and a controller in operable communication with the plurality of image sensors, the head tracker, and the display. The plurality of image sensors includes: a first image sensor that provides an image with a first FOV and a second image sensor that provides an image with a second FOV. The first FOV has a non-overlapping section that does not overlap with the second FOV and an overlapping section that overlaps with the second FOV. The second FOV has a non-overlapping section that does not overlap with the first FOV and an overlapping section that overlaps with the overlapping section of the first FOV. The overlapping section of the first FOV overlaps with the overlapping section of the second FOV and the overlapping section of the second FOV overlaps with the overlapping section of the first FOV. The controller is configured to: generate the IFOV from the image data from the plurality of image sensors, wherein the image sensors that contribute image data to the IFOV are determined based on the azimuth angle and the elevation angle; wherein, when the IFOV includes image data from both the first image sensor and the second image sensor which have overlapping FOVs, the IFOV includes a portion of the non-overlapping section of the first FOV, the overlapping sections of both the first FOV and the second FOV, and a portion of the non-overlapping section of the second FOV; wherein the overlapping section of the first FOV is blended with the overlapping section of the second FOV to form a blended overlapping section, wherein each of the overlapping section of the first FOV and the overlapping section of the second FOV has a level of contribution to the blended overlapping section; wherein the level of contribution to the blending from the overlapping section of the first FOV increases as the viewer's head moves in a first angular direction and decreases as the viewer's head moves in a second angular direction; wherein the level of contribution to the blending from the overlapping section of the second FOV decreases as the viewer's head moves in the first angular direction and increases as the viewer's head moves in the second angular direction; and wherein the first and second angular directions both correspond to a change in azimuth or both correspond to a change in elevation.

In another embodiment, A method of providing image control in a panoramic image system with parallax mitigation is disclosed. The panoramic image system includes a controller in operable communication with a plurality of image sensors, a head tracker, and a display configured to selectively display images sensed by the image sensors in an instantaneous field of view (IFOV). The method includes: generating the IFOV from image data from the plurality of image sensors comprising a first image sensor that provides an image with a first FOV and a second image sensor that provides an image with a second FOV; wherein the first FOV has a non-overlapping section that does not overlap with the second FOV and an overlapping section that overlaps with the second FOV, wherein the second FOV has a non-overlapping section that does not overlap with the first FOV and an overlapping section that overlaps with the overlapping section of the first FOV, and wherein the overlapping section of the first FOV overlaps with the overlapping section of the second FOV and the overlapping section of the second FOV overlaps with the overlapping section of the first FOV; wherein the image sensors that contribute image data to the IFOV are determined based on an azimuth angle and an elevation angle provided by a head tracker configured to supply an azimuth position signal and an elevation position signal representative of an angular position of a viewer's head, wherein the azimuth position signal corresponds to the azimuth angle and the elevation position signal corresponds to the elevation angle; wherein, when the IFOV includes image data from both the first image sensor and the second image sensor which have overlapping FOVs, the IFOV includes a portion of the non-overlapping section of the first FOV, the overlapping sections of both the first FOV and the second FOV, and a portion of the non-overlapping section of the second FOV; wherein the overlapping section of the first FOV is blended with the overlapping section of the second FOV to form a blended overlapping section, wherein each of the overlapping section of the first FOV and the overlapping section of the second FOV has a level of contribution to the blended overlapping section; wherein the level of contribution to the blending from the overlapping section of the first FOV increases as the viewer's head moves in a first angular direction and decreases as the viewer's head moves in a second angular direction; wherein the level of contribution to the blending from the overlapping section of the second FOV decreases as the viewer's head moves in the first angular direction and increases as the viewer's head moves in the second angular direction; and wherein the first and second angular directions both correspond to a change in azimuth or both correspond to a change in elevation. The method further includes causing the IFOV to be displayed on the display.

In yet another embodiment, a controller for providing image control in a panoramic image system with parallax mitigation is disclosed. The controller includes one or more processors configured by programming instructions on non-transitory computer readable media. The controller is in operable communication with a plurality of image sensors including a first image sensor that provides an image with a first FOV and a second image sensor that provides an image with a second FOV, wherein the first FOV has a non-overlapping section that does not overlap with the second FOV and an overlapping section that overlaps with the second FOV, wherein the second FOV has a non-overlapping section that does not overlap with the first FOV and an overlapping section that overlaps with the overlapping section of the first FOV, and wherein the overlapping section of the first FOV overlaps with the overlapping section of the second FOV and the overlapping section of the second FOV overlaps with the overlapping section of the first FOV. The controller is in operable communication with a head tracker configured to supply an azimuth position signal and an elevation position signal representative of an angular position of a viewer's head, wherein the azimuth position signal corresponds to an azimuth angle and the elevation position signal corresponds to an elevation angle. The controller is in operable communication with a display configured to selectively display images sensed by the image sensors in an instantaneous field of view (IFOV). The controller is configured to: generate the IFOV from the image data from the plurality of image sensors, wherein the image sensors that contribute image data to the IFOV are determined based on the azimuth angle and the elevation angle; wherein, when the IFOV includes image data from both the first image sensor and the second image sensor which have overlapping FOVs, the IFOV includes a portion of the non-overlapping section of the first FOV, the overlapping sections of both the first FOV and the second FOV, and a portion of the non-overlapping section of the second FOV; wherein the overlapping section of the first FOV is blended with the overlapping section of the second FOV to form a blended overlapping section, wherein each of the overlapping section of the first FOV and the overlapping section of the second FOV has a level of contribution to the blended overlapping section; wherein the level of contribution to the blending from the overlapping section of the first FOV increases as the viewer's head moves in a first angular direction and decreases as the viewer's head moves in a second angular direction; wherein the level of contribution to the blending from the overlapping section of the second FOV decreases as the viewer's head moves in the first angular direction and increases as the viewer's head moves in the second angular direction; and wherein the first and second angular directions both correspond to a change in azimuth or both correspond to a change in elevation.

Furthermore, other desirable features and characteristics of the panoramic image system, controller, and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIGS. 4A-4E are block diagrams illustrating an example embodiment with varying levels of contribution from a first FOV area and a second FOV area to an overlap area based on the head-position angle ($\beta_{norm}$), in accordance with some embodiments.

DETAILED DESCRIPTION

The following detailed description is merely exemplary in nature and is not intended to limit the invention or the application and uses of the invention. As used herein, the words "exemplary" or "example" mean "serving as an example, instance, or illustration." Thus, any embodiment described herein as "exemplary" or "example" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
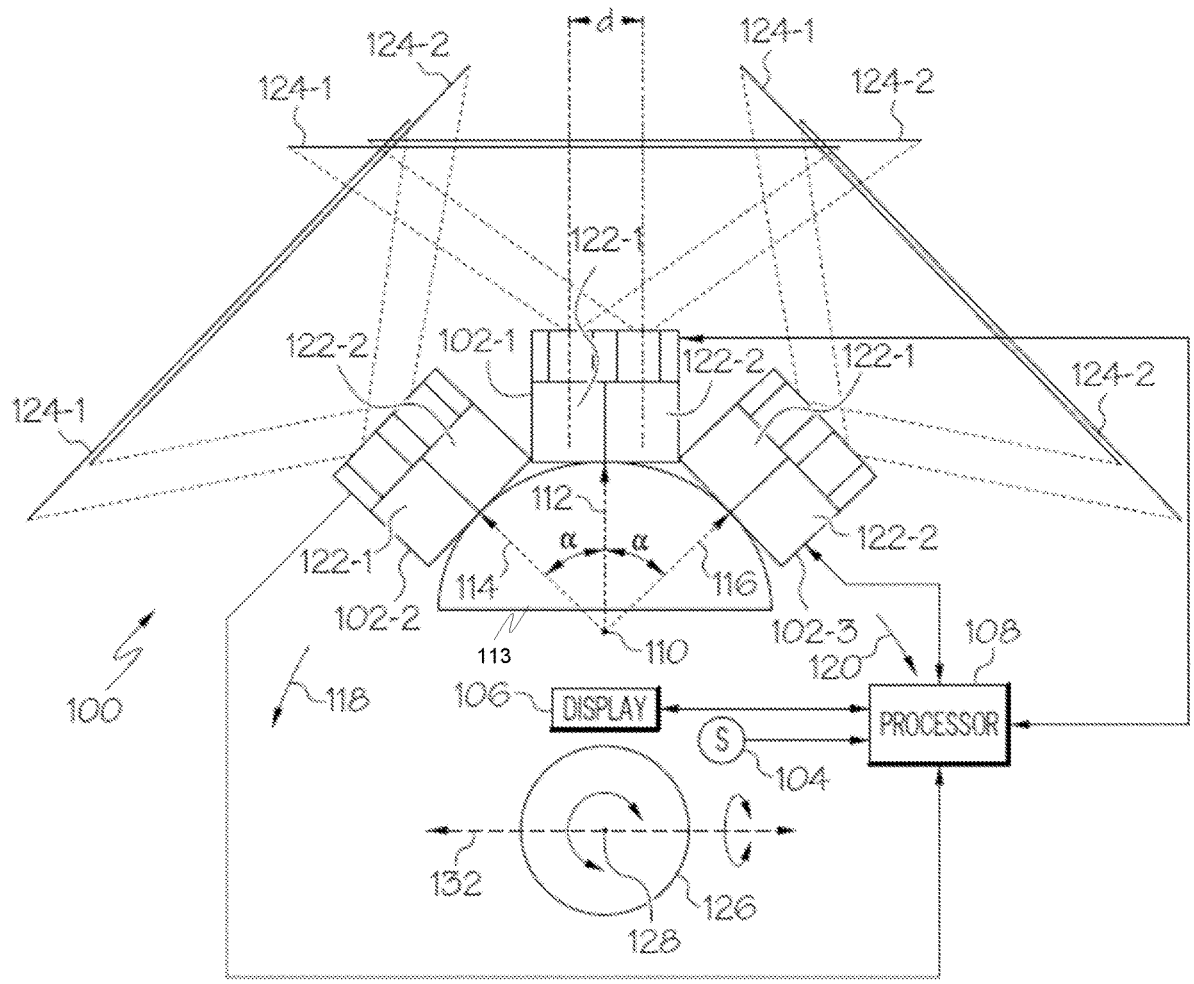
FIG. 1 depicts a functional block diagram of an example panoramic image system with parallax mitigation, in accordance with some embodiments.

Referring to FIG. 1, a panoramic image system 100 with parallax mitigation is depicted and includes at least a plurality of image sensors 102 (102-1, 102-2, 102-3 ... 102-N), a head tracker 104, a display 106, and a controller 108. Each image sensor 102 is fixedly mounted a predetermined linear distance from a first reference axis 110 and is disposed adjacent to at least one other image sensor 102. In the depicted embodiment, each image sensor 102 is fixedly mounted to a camera ring mount structure 113 that, at least in the depicted embodiment, is semi-circular in cross-section. It will be appreciated that in other embodiments, the camera ring mount structure 113 could be less than semi-circular in cross-section, circular in cross-section, or between semi-circular and circular in cross-section.

Regardless of the specific cross-section shape of the camera ring mount structure 113, each image sensor 102 is disposed to point in a direction that is offset from its adjacent image sensor 102 by a predetermined angular magnitude ($\alpha$). It will be appreciated that the predetermined angular magnitude ($\alpha$) may vary, and may be determined based, for example, on the number of image sensors 102 included in the system 100. In the depicted embodiment, the system 100 is implemented with three image sensors 102—a first image sensor 102-1, a second image sensor 102-2, and a third image sensor 102-3.

The first image sensor 102-1 is fixedly mounted a predetermined linear distance (dl) from a first reference axis 110 and is disposed to point in a first direction 112. The second image sensor 102-2 and the third image sensor 102-3 are also fixedly mounted the predetermined linear distance from the first reference axis 110. However, the second image sensor 102-2 is disposed to point in a second direction 114 and the third image sensor 102-3 is disposed to point in a third direction 116. As FIG. 1 illustrates, the second direction is the predetermined angular magnitude ($\alpha$) in a first rotational direction 118 about the reference axis 110, and the third direction is the predetermined angular magnitude ($\alpha$) in a second rotational direction 120 about the reference axis 110. In one particular embodiment, the predetermined angular magnitude ($\alpha$) is 45-degrees.

It will additionally be appreciated that the image sensors 102 may be variously configured and implemented. For example, each image sensor 102 may be implemented using one, two, or three or more image sensing devices. In the depicted embodiment, each of the image sensors 102 comprise a pair of stereoscopic cameras 122—a first camera 122-1 and a second camera 122-2. Preferably, the first and second cameras in each pair 122 are identical, and have identically dimensioned, and partially overlapping, sensor field-of-views (FOVs). For example, each first camera 122-1 has a first FOV 124-1, and each second camera 122-2 has a second FOV 124-2 that is equal to the first FOV 124-1. Although the FOV of each camera may vary, in one particular physical implementation, the first and second FOVs 124-1, 124-2 each have a horizontal FOV (HFOV) of 76-degrees and a vertical FOV (VFOV) of 61-degrees. As may be appreciated, the horizontal and vertical FOVs can vary.

As may be appreciated, because the stereoscopic camera pairs 122 that comprise each image sensor 102 are separated by a predetermined separation distance (d), the first and second FOVs 124-1, 124-2 are not fully coextensive. The predetermined separation distance (d) may vary. In one particular embodiment, however, the predetermined separation distance (d) is about 2.5-inches (or 63.5 mm), which corresponds to around the mean interpupillary distance (IPD) for human males. It will be appreciated that the predetermined separation distance (d) may vary, and may, in some embodiments, be adjustable to a longer or shorter separation distance.

The head tracker 104 is configured to sense at least the angular position and movement direction of a viewer's head 126 about a second reference axis 128 that is parallel to the first reference axis 110. The head tracker 104 is configured, in response to movement about the second reference axis 128, to supply an azimuth position signal representative thereof to the controller 108. The head tracker 104 may also be further configured, in at least some embodiments, to sense the angular position and movement direction of the viewer's head 126 about a third reference axis 132 that is perpendicular to both the first and second reference axes 110, 128. The head tracker 104, when configured to do so, is further configured, in response to movement about the third reference axis 132, to supply an elevation position signal representative thereof to the controller 108. The head tracker 104 may be implemented using any one of numerous known sensing devices for sensing the azimuthal and/or elevational position of a viewer's head 126. Some non-limiting examples include inertial measurement units (IMUs), magnetic head trackers, optical head trackers, and various combinations thereof.

The display 106 is configured to selectively display images sensed by each of the image sensors 102. More specifically, and as will be described further below, the display is responsive to commands from the controller 108 to display images from one or two of the image sensors 102. The display 106 may be implemented using any one of numerous known display types, such as a near-to-eye (NTE) display or a forward looking display that scans around a plurality of images using conventional controls. In one particular embodiment, the display 106 is implemented using a NTE display, such as a head-worn device that is configured similar to a pair of goggles or glasses. The display 106 also has a FOV referred to herein as an instantaneous FOV (IFOV). Although the IFOV of the display 106 may vary, it is typically smaller and narrower than the FOV of the cameras 122. For example, in the embodiment in which the first and second sensor FOVs 124-1, 124-2 each have a horizontal FOV (HFOV) of 76-degrees and a vertical FOV (VFOV) of 61-degrees, this same implementation uses a NTE display 106 that has an IFOV with a HFOV of 20-degrees and a VFOV of 27-degrees. Thus, in this embodiment, while the cameras implement landscape type FOVs, the NTE display 106 implements a portrait type FOV. It will be appreciated that in other embodiments the cameras and NTE display 106 could both implement landscape or portrait type FOVs.

The controller 108 is implemented by a processing component. The processing component includes at least one processor and a non-transitory computer-readable storage device or media encoded with programming instructions for configuring the processing component. The processor may be any custom-made or commercially available processor, a central processing unit (CPU), a graphics processing unit (GPU), an application specific integrated circuit (ASIC), a field programmable gate array (FPGA), an auxiliary processor among several processors associated with the processing component, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the processing component.

The controller 108 is in operable communication with each of the image sensors 102, with the head tracker 104, and with the NTE display 106. The controller 108, as noted above, receives the azimuth position signal and/or the elevation position signal from the head tracker 104, and is configured, based one the azimuth position signal and/or the elevation position signal, to command the NTE display 106 to display images sensed by one or two of the image sensors 102. More specifically, when, as in the depicted embodiment, the system 100 is implemented with three image sensors 102-1, 102-2, 102-3, the controller 108, in response to the azimuth position signal and/or the elevation position signal, commands the NTE display 106 to display images sensed by one or more of: only the first image sensor 102-1, both the first image sensor 102-1 and the second image sensor 102-2 in a first overlapping image region, only the second image sensor 102-2, only the third image sensor 102-3, and/or both the first image sensor 102-1 and the third image sensor 102-3 in a second overlapping image region. The controller 108 commands the NTE display 106 to display particular sensed images based on the rotational angle/azimuthal position of the viewer's head relative to the first direction 112. That rotational angle is referred to herein as the head-position angle ($\beta_{norm}$).

The controller 108 is configured to generate the IFOV from the image data from the plurality of image sensors, wherein the image sensors that contribute image data to the IFOV are determined based on the azimuth angle and the elevation angle and cause the IFOV to be displayed on the display.

The NTE display 106 selectively displays the IFOV, which is made up of images sensed by one or more of the image sensors 102 (e.g., camera pair). As the head-position angle ($\beta_{norm}$) changes, the source(s) of the images in the IFOV displayed in the display 106 moves between the various sensors 102.

Figure 2:
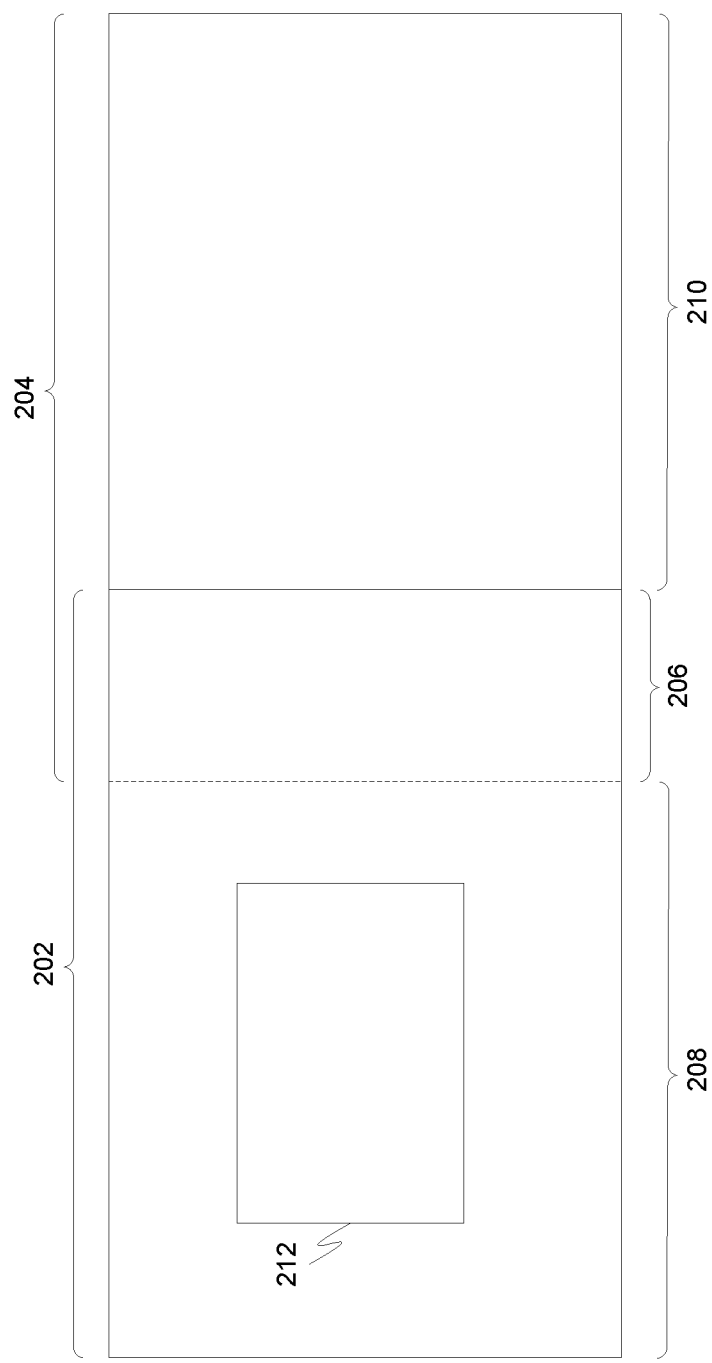
FIG. 2 is a block diagram illustrating an example display IFOV and example FOVs of two adjacent sensors, in accordance with some embodiments.

FIG. 2 is a block diagram illustrating an example display IFOV and example FOVs of two adjacent sensors 102. Depicted, in this example, are a first FOV area 202 for a first sensor, a second FOV area 204 for a second sensor, an overlap area 206 wherein the first FOV area 202 overlaps with the second FOV area 204, a first non-overlapping FOV area 208 of the first FOV area 202, a second non-overlapping FOV area 210 of the second FOV area 204, and an IFOV area 212. The head-position angle ($\beta_{norm}$) determines the position of the IFOV area 212 relative to the first FOV area 202 and the second FOV area 204. The overlap area 206 minimizes parallax errors associated with displaying images, simultaneously, from two different angles, and includes a predetermined amount of hysteresis.

As the head is panned in a first angular direction, the IFOV moves from being completely enveloped in the first non-overlapping FOV area 208, to being enveloped in both the first non-overlapping FOV area 208 and the overlap area 206, to being enveloped in the first non-overlapping FOV area 208, the overlap area 206, and the second non-overlapping FOV area 210, to being enveloped in the overlap area 206 and the second non-overlapping FOV area 210; to being completely enveloped in the second non-overlapping FOV area 210. As the head is panned in an opposite direction, the IFOV moves in the opposite direction between the second non-overlapping FOV area 210, the overlap area 206, and the first non-overlapping FOV area 208.

The overlap area 206 includes image data from both the first FOV area 202 and the second FOV area 204. When the IFOV area 212 encompasses at least a portion of the overlap area 206 between sensor FOVs, the amount of image data contribution from the first FOV area 202 and the second FOV area 204 to the overlap area 206 varies depending on the head-position angle ($\beta_{norm}$). FIGS. 3A-3E are block diagrams illustrating an example embodiment with varying levels of contribution from the first FOV area 202 and the second FOV area 204 to the overlap area 206 based on the head-position angle ($\beta_{norm}$).

Figure 3A:
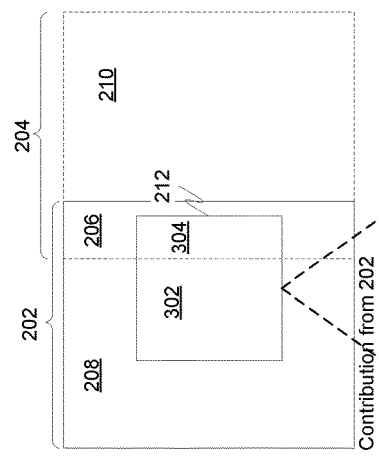
FIGS. 3A-3E are block diagrams illustrating an example embodiment with varying levels of contribution from a first FOV area and a second FOV area to an overlap area based on a head-position angle ($\beta_{norm}$), in accordance with some embodiments.

In the example of FIG. 3A, the IFOV area 212 is completely enveloped within the first FOV area 202, but a portion is within the overlap area 206. In this example, the first FOV area 202 contributes all of the image data for a first portion 302 of IFOV area 212 and most of the image data for a second portion 304 of IFOV area 212 in the overlap area 206.

Figure 3B:
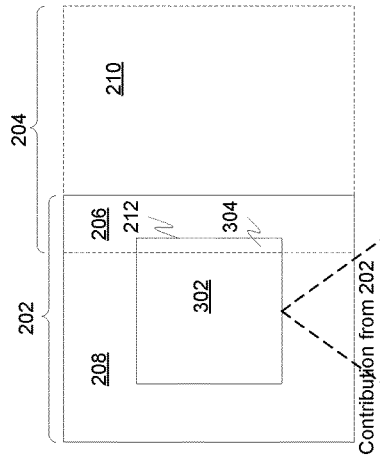

In the example of FIG. 3B, as the head-position angle ($\beta_{norm}$) moved further in the first angular direction, the IFOV area 212 is still completely enveloped within the first FOV area 202, but a larger portion of the IFOV area 212 is within the overlap area 206. In this example, the first FOV area 202 contributes all of the image data for the first portion 302 of IFOV area 212 and some of the image data for a second portion 304 of IFOV area 212 in the overlap area 206. The second FOV area 204 also contributes some of the image data for the second portion 304 of IFOV area 212 in the overlap area 206. The amount of image data contributed by the first FOV area 202 to the second portion 304 of IFOV area 212 in the overlap area 206 has decreased and the amount of image data contributed by the second FOV area 204 to the second portion 304 of IFOV area 212 in the overlap area 206 has increased.

Figure 3C:
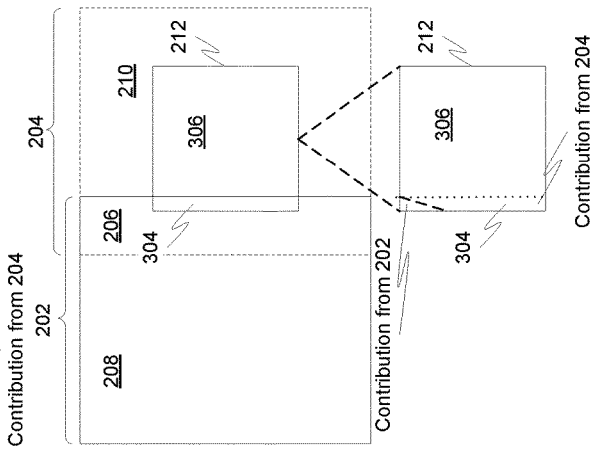

In the example of FIG. 3C, as the head-position angle ($\beta_{norm}$) moved further in the first angular direction, a first portion 302 of the IFOV area 212 is enveloped within the first non-overlapping FOV area 208, a second portion 304 is enveloped within the overlap area 206, and a third portion 306 is enveloped within the second non-overlapping FOV area 210. In this example, the first FOV area 202 contributes all of the image data for the first portion 302 and some of the image data for a second portion 304 of IFOV area 212 in the overlap area 206. The second FOV area 204 contributes all of the image data for the third portion and some of the image data for a second portion 304 of IFOV area 212 in the overlap area 206. The amount of image data contributed by the first FOV area 202 to the second portion 304 of IFOV area 212 in the overlap area 206 has decreased and the amount of image data contributed by the second FOV area 204 to the second portion 304 of IFOV area 212 in the overlap area 206 has increased.

In some examples, the first FOV area 202 and the second FOV area 204 contribute an equal amount of image data to the overlap area 206. In some examples, the level of image data contribution to the overlap area 206 by each of the first FOV area 202 and the second FOV area 204 is based on the relative size of the first portion 302 and the third portion 306 to each other. In these examples if the first portion 302 is larger than the third portion 306 then the first FOV area 202 contributes more image data to the second portion 304 than the second FOV area 204. Conversely, in these examples, when the third portion 306 is larger than the first portion 302 then the second FOV area 204 contributes more image data to the second portion 304 than the first FOV area 202.

Figure 3D:
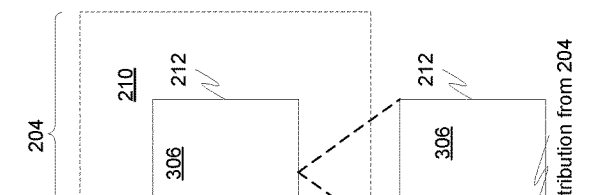

In the example of FIG. 3D, as the head-position angle ($\beta_{norm}$) moved further in the first angular direction, the IFOV area 212 is completely enveloped within the second FOV area 204 with a second portion 304 of the IFOV area 212 within the overlap area 206. In this example, the first FOV area 202 contributes some of the image data for the second portion 304 of IFOV area 212 in the overlap area 206. The second FOV area 204 contributes all of the image data for a third portion 306 and some of the image data for the second portion 304 of IFOV area 212 in the overlap area 206. The amount of image data contributed by the first FOV area 202 to the second portion 304 of IFOV area 212 in the overlap area 206 has decreased and the amount of image data contributed by the second FOV area 204 to the second portion 304 of IFOV area 212 in the overlap area 206 has increased.

Figure 3E:
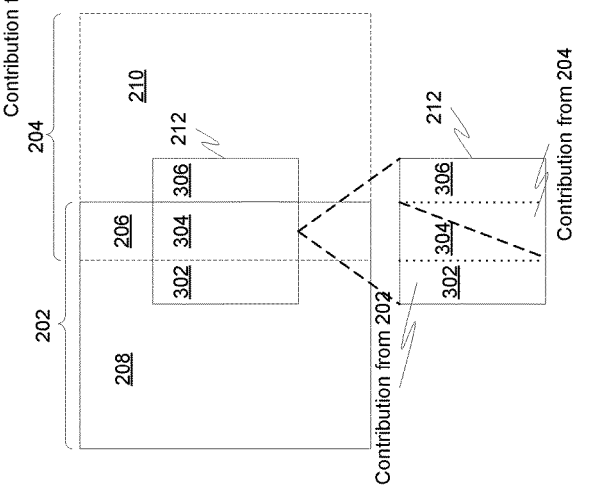

In the example of FIG. 3E, as the head-position angle ($\beta_{norm}$) moved further in the first angular direction, the IFOV area 212 is still completely enveloped within the second FOV area 204, and a second portion 304 of the IFOV area 212 is within the overlap area 206. In this example, the first FOV area 202 contributes some of the image data for the second portion 304 of IFOV area 212 in the overlap area 206. The second FOV area 204 contributes all of the image data for a third portion 306 and some of the image data for the second portion 304 of IFOV area 212 in the overlap area 206. The amount of image data contributed by the first FOV area 202 to the second portion 304 of IFOV area 212 in the overlap area 206 has decreased and the amount of image data contributed by the second FOV area 204 to the second portion 304 of IFOV area 212 in the overlap area 206 has increased.

Although the foregoing describes changes in contributions to the image data within the overlap area when the head-position angle ($\beta_{norm}$) has moved in the first angular direction, an opposite change in contributions to the image data within the overlap area can occur when the head-position angle ($\beta_{norm}$) has moved in a second direction that is opposite to the first angular direction. When the head-position angle ($\beta_{norm}$) has moved in the second direction, the level of contribution of image data to the second portion 404 from the first FOV area 202 within the overlap area 206 decreased and the level of contribution of image data to the second portion 304 from the second FOV area 204 within the overlap area 206 increases.

While the foregoing describes horizontal changes, the same principles may be applied to vertical changes when an IFOV transitions from one FOV to a second FOV directly above or below the one FOV. The changes in level of contribution could be based on number of pixels contributed, the intensity level of pixels, or some other methodology.

FIGS. 4A-4E are block diagrams illustrating an example embodiment with varying levels of contribution from the first FOV area 202 and the second FOV area 204 to the overlap area 206 based on the head-position angle ($\beta_{norm}$).

In the example of FIG. 4A, a first portion 402 of the IFOV area 212 is enveloped within the first non-overlapping FOV area 208, a second portion 404 is enveloped within the overlap area 206, and a third portion 406 is enveloped within the second non-overlapping FOV area 210. In this example, the first non-overlapping FOV area 208 contributes the image data for the first portion 402, the second non-overlapping FOV area 210 contributes image data for the third portion 406, and the portion of the first FOV area 202 within the overlap area 206 and the portion of the second FOV area 204 within the overlap area 206 combine to contribute image data to the second portion 404. The amount of contribution from each FOV varies dependent on the head-position angle ($\beta_{norm}$). When the head-position angle ($\beta_{norm}$) is such that a majority of the IFOV area 212 is within the first FOV area 202, then the first FOV area 202 contributes a greater share of image data to the second portion 404 and the second FOV area 204 contributes a smaller share of image data to the second portion 404.

In the example of FIG. 4B, as the head-position angle ($\beta_{norm}$) has moved further in the first angular direction, the size of the first portion 402 of the IFOV area 212 that is enveloped within the first non-overlapping FOV area 208 decreased and the size of the third portion enveloped within the second non-overlapping FOV area 210 increases. The size of the second portion 404 enveloped within the overlap area 206 remains the same but the level of contribution from the portion of the first FOV area 202 within the overlap area 206 and the level of contribution from the portion of the second FOV area 204 within the overlap area 206 changes. The level of contribution of image data to the second FOV area 204 from the portion of the first FOV area 202 within the overlap area 206 decreased and the level of contribution of image data to the second FOV area 204 from the portion of the second FOV area 204 within the overlap area 206 increased.

In the example of FIG. 4C, as the head-position angle ($\beta_{norm}$) has moved further in the first angular direction, the size of the first portion 402 of the IFOV area 212 that is enveloped within the first non-overlapping FOV area 208 decreased further and the size of the third portion enveloped within the second non-overlapping FOV area 210 increased. The size of the second portion 404 enveloped within the overlap area 206 remains the same but the level of contribution from the portion of the first FOV area 202 within the overlap area 206 and the level of contribution from the portion of the second FOV area 204 within the overlap area 206 changed. The level of contribution of image data to the second FOV area 204 from the portion of the first FOV area 202 within the overlap area 206 decreased and the level of contribution of image data to the second FOV area 204 from the portion of the second FOV area 204 within the overlap area 206 increased such that the first FOV area 202 contributes an equal share of image data to the second portion 404 as the contribution of image data by the second FOV area 204 to the second portion 404.

In the example of FIG. 4D, as the head-position angle ($\beta_{norm}$) has moved further in the first angular direction, the size of the first portion 402 of the IFOV area 212 that is enveloped within the first non-overlapping FOV area 208 decreased and the size of the third portion enveloped within the second non-overlapping FOV area 210 increased. The size of the second portion 404 enveloped within the overlap area 206 remained the same but the level of contribution from the portion of the first FOV area 202 within the overlap area 206 and the level of contribution from the portion of the second FOV area 204 within the overlap area 206 changed. The level of contribution of image data to the second FOV area 204 from the portion of the first FOV area 202 within the overlap area 206 decreased and the level of contribution of image data to the second FOV area 204 from the portion of the second FOV area 204 within the overlap area 206 increased, such that the first FOV area 202 contributed a smaller share of image data to the second portion 404 and the second FOV area 204 contributed a greater share of image data to the second portion 404.

In the example of FIG. 4E, as the head-position angle ($\beta_{norm}$) has moved further in the first angular direction, the size of the first portion 402 of the IFOV area 212 that is enveloped within the first non-overlapping FOV area 208 decreased further and the size of the third portion enveloped within the second non-overlapping FOV area 210 increased.

The size of the second portion 404 enveloped within the overlap area 206 remained the same but the level of contribution from the portion of the first FOV area 202 within the overlap area 206 and the level of contribution from the portion of the second FOV area 204 within the overlap area 206 changed. The level of contribution of image data to the second FOV area 204 from the portion of the first FOV area 202 within the overlap area 206 decreased more and the level of contribution of image data to the second FOV area 204 from the portion of the second FOV area 204 within the overlap area 206 increased more.

Although the foregoing describes changes in contributions to the image data within the overlap area when the head-position angle ($\beta_{norm}$) moved in the first angular direction, an opposite change in contributions to the image data within the overlap area can occur when the head-position angle ($\beta_{norm}$) moves in the second direction. When the head-position angle ($\beta_{norm}$) moves in the second direction, the level of contribution of image data to the second portion 404 from the first FOV area 202 within the overlap area 206 decreases and the level of contribution of image data to the second portion 404 from the second FOV area 204 within the overlap area 206 increases.

While the foregoing describes horizontal changes, the same principles may be applied to vertical changes when an IFOV transitions from one FOV to a second FOV directly above or below the one FOV. The changes in level of contribution could be based on number of pixels contributed, the intensity level of pixels, or some other methodology.

In some embodiments, the level of contribution to the blending from the overlapping section of the first FOV area 202 increases in a non-linear manner as the viewer's head moves in a first angular direction (e.g., left, right, up, or down) and decreases in a non-linear manner as the viewer's head moves in a second angular direction (opposite of the first angular direction); and/or the level of contribution to the blending from the overlapping section of the second FOV area 204 decreases in a non-linear manner as the viewer's head moves in the first angular direction and increases in a non-linear manner as the viewer's head moves in the second angular direction.

In some embodiments, the level of contribution to the blending from the overlapping section of the first FOV area 202 increases linearly as the viewer's head moves in a first angular direction and decreases linearly as the viewer's head moves in a second angular direction; and/or the level of contribution to the blending from the overlapping section of the second FOV area 204 decreases linearly as the viewer's head moves in the first angular direction and increases linearly as the viewer's head moves in the second angular direction.

In some embodiments, the level of contribution to the blending is based on the intensity level of the pixels contributed to the blended overlapping section. In some embodiments, the intensity level of the pixels from the first FOV area 202 in the blended overlapping section is inversely proportional to the intensity level of the pixels from the second FOV area 204 in the blended overlapping section. In some embodiments, the level of contribution to the blending is based on the number of pixels contributed to the blended overlapping section.

In some embodiments, an increase in the level of contribution to the blending from the overlapping section of the first FOV area 202 as the viewer's head moves in the first angular direction is not directly correlated with head motion in time. In some embodiments, a decrease in the level of contribution to the blending from the overlapping section of the first FOV area 202 as the viewer's head moves in the second angular direction is not directly correlated with head motion in time. In some embodiments, a decrease in the level of contribution to the blending from the overlapping section of the second FOV area 204 as the viewer's head moves in the first angular direction is not directly correlated with head motion in time. In some embodiments, an increase in the level of contribution to the blending from the overlapping section of the second FOV area 204 as the viewer's head moves in the second angular direction is not directly correlated with head motion in time.

In some embodiments, the increase in the level of contribution to the blending from the overlapping section of the first FOV area 202 is based on anticipating movement of the viewer's head in the first angular direction such that the increase is not directly correlated with head motion in time. In some embodiments, the decrease in the level of contribution to the blending from the overlapping section of the first FOV area 202 is based on anticipating movement of the viewer's head in the second angular direction such that the decrease is not directly correlated with head motion in time.

In some embodiments, the decrease in the level of contribution to the blending from the overlapping section of the second FOV area 204 is based on anticipating movement of the viewer's head in the first angular direction such that the decrease is not directly correlated with head motion in time. In some embodiments, the increase in the level of contribution to the blending from the overlapping section of the second FOV area 204 is based on anticipating movement of the viewer's head in the second angular direction such that the increase is not directly correlated with head motion in time.

In some embodiments, an increase in the level of contribution to the blending from the overlapping section of the first FOV area 202 is delayed as the viewer's head moves in the first angular direction such that the increase is not directly correlated with head motion in time. In some embodiments, a decrease in the level of contribution to the blending from the overlapping section of the first FOV area 202 is delayed as the viewer's head moves in the second angular direction such that the decrease is not directly correlated with head motion in time.

In some embodiments, a decrease in the level of contribution to the blending from the overlapping section of the second FOV area 204 is delayed as the viewer's head moves in the first angular direction such that the decrease is not directly correlated with head motion in time. In some embodiments, an increase in the level of contribution to the blending from the overlapping section of the second FOV area 204 is delayed as the viewer's head moves in the second angular direction such that the increase is not directly correlated with head motion in time.

Figure 5:
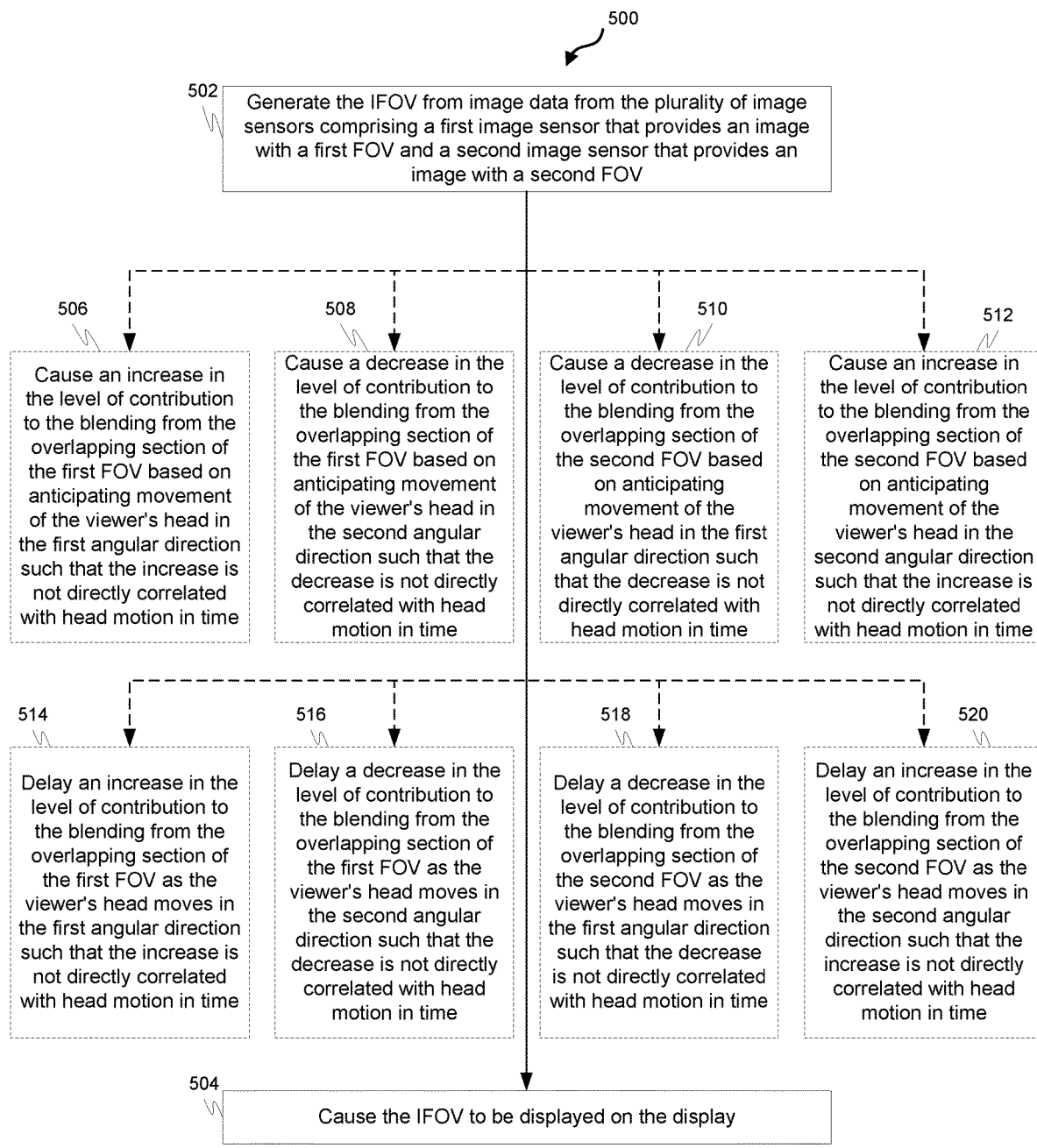
FIG. 5 is a process flow chart depicting an example process for providing image control (e.g., by a controller) in a panoramic image system with parallax mitigation, in accordance with some embodiments.

FIG. 5 is a process flow chart depicting an example process 500 for providing image control (e.g., by a controller) in a panoramic image system with parallax mitigation. The panoramic image system includes a controller in operable communication with a plurality of image sensors, a head tracker, and a display configured to selectively display images sensed by the image sensors in an instantaneous FOV (IFOV).

The example process 500 includes generating the IFOV from image data from the plurality of image sensors comprising a first image sensor that provides an image with a first FOV and a second image sensor that provides an image with a second FOV (operation 502). The example process 500 further includes causing the IFOV to be displayed on the display (operation 504).

The first FOV has a non-overlapping section that does not overlap with the second FOV and an overlapping section that overlaps with the second FOV. The second FOV has a non-overlapping section that does not overlap with the first FOV and an overlapping section that overlaps with the overlapping section of the first FOV. The overlapping section of the first FOV overlaps with the overlapping section of the second FOV and the overlapping section of the second FOV overlaps with the overlapping section of the first FOV.

The image sensors that contribute image data to the IFOV are determined based on an azimuth angle and an elevation angle provided by a head tracker configured to supply an azimuth position signal and an elevation position signal representative of an angular position of a viewer's head. The azimuth position signal corresponds to the azimuth angle and the elevation position signal corresponds to the elevation angle.

When the IFOV includes image data from both the first image sensor and the second image sensor which have overlapping FOVs, the IFOV includes a portion of the non-overlapping section of the first FOV, the overlapping sections of both the first FOV and the second FOV, and a portion of the non-overlapping section of the second FOV. The overlapping section of the first FOV is blended with the overlapping section of the second FOV to form a blended overlapping section, wherein each of the overlapping section of the first FOV and the overlapping section of the second FOV has a level of contribution to the blended overlapping section. The level of contribution to the blending from the overlapping section of the first FOV increases as the viewer's head moves in a first angular direction and decreases as the viewer's head moves in a second angular direction. The level of contribution to the blending from the overlapping section of the second FOV decreases as the viewer's head moves in the first angular direction and increases as the viewer's head moves in the second angular direction. The first and second angular directions both correspond to a change in azimuth or both correspond to a change in elevation In some embodiments, the level of contribution to the blending from the overlapping section of the first FOV increases in a non-linear manner as the viewer's head moves in a first angular direction and decreases in a non-linear manner as the viewer's head moves in a second angular direction; and/or the level of contribution to the blending from the overlapping section of the second FOV decreases in a non-linear manner as the viewer's head moves in the first angular direction and increases in a non-linear manner as the viewer's head moves in the second angular direction.

In some embodiments, the level of contribution to the blending from the overlapping section of the first FOV increases linearly as the viewer's head moves in a first angular direction and decreases linearly as the viewer's head moves in a second angular direction; and/or the level of contribution to the blending from the overlapping section of the second FOV decreases linearly as the viewer's head moves in the first angular direction and increases linearly as the viewer's head moves in the second angular direction.

In some embodiments, the level of contribution to the blending is based on the intensity level of the pixels contributed to the blended overlapping section. In some embodiments, the intensity level of the pixels from the first FOV is inversely proportional to the intensity level of the pixels from the second FOV. In some embodiments, the level of contribution to the blending is based on the number of pixels contributed to the blended overlapping section.

In some embodiments, an increase in the level of contribution to the blending from the overlapping section of the first FOV as the viewer's head moves in the first angular direction is not directly correlated with head motion in time. In some embodiments, a decrease in the level of contribution to the blending from the overlapping section of the first FOV as the viewer's head moves in the second angular direction is not directly correlated with head motion in time. In some embodiments, a decrease in the level of contribution to the blending from the overlapping section of the second FOV as the viewer's head moves in the first angular direction is not directly correlated with head motion in time. In some embodiments, an increase in the level of contribution to the blending from the overlapping section of the second FOV as the viewer's head moves in the second angular direction is not directly correlated with head motion in time.

In some embodiments, the example process 500 optionally includes causing an increase in the level of contribution to the blending from the overlapping section of the first FOV based on anticipating movement of the viewer's head in the first angular direction such that the increase is not directly correlated with head motion in time (operation 506).

In some embodiments, the example process 500 optionally includes causing a decrease in the level of contribution to the blending from the overlapping section of the first FOV based on anticipating movement of the viewer's head in the second angular direction such that the decrease is not directly correlated with head motion in time (operation 508).

In some embodiments, the example process 500 optionally includes causing a decrease in the level of contribution to the blending from the overlapping section of the second FOV based on anticipating movement of the viewer's head in the first angular direction such that the decrease is not directly correlated with head motion in time (operation 510).

In some embodiments, the example process 500 optionally includes causing an increase in the level of contribution to the blending from the overlapping section of the second FOV based on anticipating movement of the viewer's head in the second angular direction such that the increase is not directly correlated with head motion in time. (operation 512).

In some embodiments, the example process 500 optionally includes delaying an increase in the level of contribution to the blending from the overlapping section of the first FOV as the viewer's head moves in the first angular direction such that the increase is not directly correlated with head motion in time (operation 514).

In some embodiments, the example process 500 optionally includes delaying a decrease in the level of contribution to the blending from the overlapping section of the first FOV as the viewer's head moves in the second angular direction such that the decrease is not directly correlated with head motion in time. (operation 516).

In some embodiments, the example process 500 optionally includes delaying a decrease in the level of contribution to the blending from the overlapping section of the second FOV as the viewer's head moves in the first angular direction such that the decrease is not directly correlated with head motion in time. (operation 518).

In some embodiments, the example process 500 optionally includes delaying an increase in the level of contribution to the blending from the overlapping section of the second FOV as the viewer's head moves in the second angular direction such that the increase is not directly correlated with head motion in time. (operation 520).

The system and method described herein provide a relatively dramatic improvement in parallax error mitigation. The system described herein was placed in a window-less vehicle and field tested on a desert course. During the field testing, none of the operators complained about optical discontinuity of the scene as the images transitioned between image sensors (i.e., camera pairs) because of the transition provided by the overlap areas.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A panoramic image system with parallax mitigation, the system comprising:
    a plurality of image sensors for providing image data, the plurality of image sensors comprising:
        a first image sensor that provides an image with a first field of view (FOV) and a second image sensor that provides an image with a second FOV;
        wherein the first FOV has a non-overlapping section that does not overlap with the second FOV and an overlapping section that overlaps with the second FOV;
        wherein the second FOV has a non-overlapping section that does not overlap with the first FOV and an overlapping section that overlaps with the overlapping section of the first FOV; and
        wherein the overlapping section of the first FOV overlaps with the overlapping section of the second FOV and the overlapping section of the second FOV overlaps with the overlapping section of the first FOV;
    a head tracker configured to supply an azimuth position signal and an elevation position signal representative of an angular position of a viewer's head, wherein the azimuth position signal corresponds to an azimuth angle and the elevation position signal corresponds to an elevation angle;
    a display configured to selectively display images sensed by the image sensors in an instantaneous FOV (IFOV); and
    a controller in operable communication with the plurality of image sensors, with the head tracker, and with the display, the controller configured to:
        generate the IFOV from the image data from the plurality of image sensors, wherein the image sensors that contribute image data to the IFOV are determined based on the azimuth angle and the elevation angle;
        wherein, when the IFOV includes image data from both the first image sensor and the second image sensor which have overlapping FOVs, the IFOV includes a portion of the non-overlapping section of the first FOV, the overlapping sections of both the first FOV and the second FOV, and a portion of the non-overlapping section of the second FOV;
        wherein the overlapping section of the first FOV is blended with the overlapping section of the second FOV to form a blended overlapping section, wherein each of the overlapping section of the first FOV and the overlapping section of the second FOV has a level of contribution to the blended overlapping section;
        wherein the level of contribution to the blending from the overlapping section of the first FOV increases as the viewer's head moves in a first angular direction and decreases as the viewer's head moves in a second angular direction;
        wherein the level of contribution to the blending from the overlapping section of the second FOV decreases as the viewer's head moves in the first angular direction and increases as the viewer's head moves in the second angular direction; and
        wherein the first and second angular directions both correspond to a change in azimuth or both correspond to a change in elevation.

2. The panoramic image system according to claim 1, wherein:
    the level of contribution to the blending from the overlapping section of the first FOV increases in a non-linear manner as the viewer's head moves in a first angular direction and decreases in a non-linear manner as the viewer's head moves in a second angular direction; and
    the level of contribution to the blending from the overlapping section of the second FOV decreases in a non-linear manner as the viewer's head moves in the first angular direction and increases in a non-linear manner as the viewer's head moves in the second angular direction.

3. The panoramic image system according to claim 1, wherein:
    the level of contribution to the blending from the overlapping section of the first FOV increases linearly as the viewer's head moves in a first angular direction and decreases linearly as the viewer's head moves in a second angular direction; and
    wherein the level of contribution to the blending from the overlapping section of the second FOV decreases linearly as the viewer's head moves in the first angular direction and increases linearly as the viewer's head moves in the second angular direction.

4. The panoramic image system according to claim 1, wherein:
the level of contribution to the blending is based on an intensity level of pixels contributed to the blended overlapping section; and
the intensity level of the pixels from the first FOV is inversely proportional to the intensity level of the pixels from the second FOV.

5. The panoramic image system according to claim 1, wherein the level of contribution to the blending is based on a number of pixels contributed to the blended overlapping section.

6. The panoramic image system according to claim 1, wherein:
an increase in the level of contribution to the blending from the overlapping section of the first FOV as the viewer's head moves in the first angular direction is not directly correlated with head motion in time;
a decrease in the level of contribution to the blending from the overlapping section of the first FOV as the viewer's head moves in the second angular direction is not directly correlated with head motion in time;
a decrease in the level of contribution to the blending from the overlapping section of the second FOV as the viewer's head moves in the first angular direction is not directly correlated with head motion in time; and
an increase in the level of contribution to the blending from the overlapping section of the second FOV as the viewer's head moves in the second angular direction is not directly correlated with head motion in time.

7. The panoramic image system according to claim 1, wherein the controller is further configured to cause:
an increase in the level of contribution to the blending from the overlapping section of the first FOV based on anticipating movement of the viewer's head in the first angular direction such that the increase is not directly correlated with head motion in time;
a decrease in the level of contribution to the blending from the overlapping section of the first FOV based on anticipating movement of the viewer's head in the second angular direction such that the decrease is not directly correlated with head motion in time;
a decrease in the level of contribution to the blending from the overlapping section of the second FOV based on anticipating movement of the viewer's head in the first angular direction such that the decrease is not directly correlated with head motion in time; and
an increase in the level of contribution to the blending from the overlapping section of the second FOV based on anticipating movement of the viewer's head in the second angular direction such that the increase is not directly correlated with head motion in time.

8. The panoramic image system according to claim 1, wherein the controller is further configured to delay:
an increase in the level of contribution to the blending from the overlapping section of the first field of view (FOV) as the viewer's head moves in the first angular direction such that the increase is not directly correlated with head motion in time;
a decrease in the level of contribution to the blending from the overlapping section of the first FOV as the viewer's head moves in the second angular direction such that the decrease is not directly correlated with head motion in time;
a decrease in the level of contribution to the blending from the overlapping section of the second FOV as the viewer's head moves in the first angular direction such that the decrease is not directly correlated with head motion in time; and
an increase in the level of contribution to the blending from the overlapping section of the second FOV as the viewer's head moves in the second angular direction such that the increase is not directly correlated with head motion in time.

9. A controller for providing image control in a panoramic image system with parallax mitigation, the controller comprising:
one or more processors configured by programming instructions on non-transitory computer readable media;
the controller in operable communication with a plurality of image sensors comprising a first image sensor that provides an image with a first FOV and a second image sensor that provides an image with a second FOV, wherein the first FOV has a non-overlapping section that does not overlap with the second FOV and an overlapping section that overlaps with the second FOV, wherein the second FOV has a non-overlapping section that does not overlap with the first FOV and an overlapping section that overlaps with the overlapping section of the first FOV, and wherein the overlapping section of the first FOV overlaps with the overlapping section of the second FOV and the overlapping section of the second FOV overlaps with the overlapping section of the first FOV;
the controller in operable communication with a head tracker configured to supply an azimuth position signal and an elevation position signal representative of an angular position of a viewer's head, wherein the azimuth position signal corresponds to an azimuth angle and the elevation position signal corresponds to an elevation angle,
the controller in operable communication with a display configured to selectively display images sensed by the image sensors in an instantaneous FOV (IFOV),
the controller configured to:
generate the IFOV from image data from the plurality of image sensors,
wherein the image sensors that contribute image data to the IFOV are determined based on the azimuth angle and the elevation angle;
wherein, when the IFOV includes image data from both the first image sensor and the second image sensor which have overlapping FOVs, the IFOV includes a portion of the non-overlapping section of the first FOV, the overlapping sections of both the first FOV and the second FOV, and a portion of the non-overlapping section of the second FOV;
wherein the overlapping section of the first FOV is blended with the overlapping section of the second FOV to form a blended overlapping section, wherein each of the overlapping section of the first FOV and the overlapping section of the second FOV has a level of contribution to the blended overlapping section;
wherein the level of contribution to the blending from the overlapping section of the first FOV increases as the viewer's head moves in a first angular direction and decreases as the viewer's head moves in a second angular direction;

wherein the level of contribution to the blending from the overlapping section of the second FOV decreases as the viewer's head moves in the first angular direction and increases as the viewer's head moves in the second angular direction; and wherein the first and second angular directions both correspond to a change in azimuth or both correspond to a change in elevation.

10. The controller according to claim 9, wherein:

an increase in the level of contribution to the blending from the overlapping section of the first FOV as the viewer's head moves in the first angular direction is not directly correlated with head motion in time;

a decrease in the level of contribution to the blending from the overlapping section of the first FOV as the viewer's head moves in the second angular direction is not directly correlated with head motion in time;

a decrease in the level of contribution to the blending from the overlapping section of the second FOV as the viewer's head moves in the first angular direction is not directly correlated with head motion in time; and an increase in the level of contribution to the blending from the overlapping section of the second FOV as the viewer's head moves in the second angular direction is not directly correlated with head motion in time.

11. The controller according to claim 9, further configured to cause:

an increase in the level of contribution to the blending from the overlapping section of the first FOV based on anticipating movement of the viewer's head in the first angular direction such that the increase is not directly correlated with head motion in time;

a decrease in the level of contribution to the blending from the overlapping section of the first FOV based on anticipating movement of the viewer's head in the second angular direction such that the decrease is not directly correlated with head motion in time;

a decrease in the level of contribution to the blending from the overlapping section of the second FOV based on anticipating movement of the viewer's head in the first angular direction such that the decrease is not directly correlated with head motion in time; and an increase in the level of contribution to the blending from the overlapping section of the second FOV based on anticipating movement of the viewer's head in the second angular direction such that the increase is not directly correlated with head motion in time.

12. The controller according to claim 9, further configured to delay:

an increase in the level of contribution to the blending from the overlapping section of the first FOV as the viewer's head moves in the first angular direction such that the increase is not directly correlated with head motion in time;

a decrease in the level of contribution to the blending from the overlapping section of the first FOV as the viewer's head moves in the second angular direction such that the decrease is not directly correlated with head motion in time;

a decrease in the level of contribution to the blending from the overlapping section of the second FOV as the viewer's head moves in the first angular direction such that the decrease is not directly correlated with head motion in time; and an increase in the level of contribution to the blending from the overlapping section of the second FOV as the viewer's head moves in the second angular direction such that the increase is not directly correlated with head motion in time.

13. A method of providing image control in a panoramic image system with parallax mitigation, the panoramic image system comprising a controller in operable communication with a plurality of image sensors, a head tracker, and a display configured to selectively display images sensed by the image sensors in an instantaneous field of view (IFOV), the method comprising:

generating the IFOV from image data from the plurality of image sensors comprising a first image sensor that provides an image with a first field of view (FOV) and a second image sensor that provides an image with a second FOV;

wherein the first FOV has a non-overlapping section that does not overlap with the second FOV and an overlapping section that overlaps with the second FOV, wherein the second FOV has a non-overlapping section that does not overlap with the first FOV and an overlapping section that overlaps with the overlapping section of the first FOV, and wherein the overlapping section of the first FOV overlaps with the overlapping section of the second FOV and the overlapping section of the second FOV overlaps with the overlapping section of the first FOV;

wherein the image sensors that contribute image data to the IFOV are determined based on an azimuth angle and an elevation angle provided by a head tracker configured to supply an azimuth position signal and an elevation position signal representative of an angular position of a viewer's head, wherein the azimuth position signal corresponds to the azimuth angle and the elevation position signal corresponds to the elevation angle;

wherein, when the IFOV includes image data from both the first image sensor and the second image sensor which have overlapping FOVs, the IFOV includes a portion of the non-overlapping section of the first FOV, the overlapping sections of both the first FOV and the second FOV, and a portion of the non-overlapping section of the second FOV;

wherein the overlapping section of the first FOV is blended with the overlapping section of the second FOV to form a blended overlapping section, wherein each of the overlapping section of the first FOV and the overlapping section of the second FOV has a level of contribution to the blended overlapping section;

wherein the level of contribution to the blending from the overlapping section of the first FOV increases as the viewer's head moves in a first angular direction and decreases as the viewer's head moves in a second angular direction;

wherein the level of contribution to the blending from the overlapping section of the second FOV decreases as the viewer's head moves in the first angular direction and increases as the viewer's head moves in the second angular direction;

wherein the first and second angular directions both correspond to a change in azimuth or both correspond to a change in elevation; and causing the IFOV to be displayed on the display.

14. The method according to claim 13, wherein:

the level of contribution to the blending from the overlapping section of the first FOV increases in a non-linear manner as the viewer's head moves in a first angular direction and decreases in a non-linear manner as the viewer's head moves in a second angular direction; and the level of contribution to the blending from the overlapping section of the second FOV decreases in a non-linear manner as the viewer's head moves in the first angular direction and increases in a non-linear manner as the viewer's head moves in the second angular direction.

15. The method according to claim 13, wherein:

the level of contribution to the blending from the overlapping section of the first FOV increases linearly as the viewer's head moves in a first angular direction and decreases linearly as the viewer's head moves in a second angular direction; and wherein the level of contribution to the blending from the overlapping section of the second FOV decreases linearly as the viewer's head moves in the first angular direction and increases linearly as the viewer's head moves in the second angular direction.

16. The method according to claim 13, wherein:

the level of contribution to the blending is based on an intensity level of pixels contributed to the blended overlapping section; and the intensity level of the pixels from the first FOV is inversely proportional to the intensity level of the pixels from the second FOV.

17. The method according to claim 13, wherein the level of contribution to the blending is based on a number of pixels contributed to the blended overlapping section.

18. The method according to claim 13, wherein:

an increase in the level of contribution to the blending from the overlapping section of the first FOV as the viewer's head moves in the first angular direction is not directly correlated with head motion in time;

a decrease in the level of contribution to the blending from the overlapping section of the first FOV as the viewer's head moves in the second angular direction is not directly correlated with head motion in time;

a decrease in the level of contribution to the blending from the overlapping section of the second FOV as the viewer's head moves in the first angular direction is not directly correlated with head motion in time; and an increase in the level of contribution to the blending from the overlapping section of the second FOV as the viewer's head moves in the second angular direction is not directly correlated with head motion in time.

19. The method according to claim 13, further comprising:

causing an increase in the level of contribution to the blending from the overlapping section of the first FOV based on anticipating movement of the viewer's head in the first angular direction such that the increase is not directly correlated with head motion in time;

causing a decrease in the level of contribution to the blending from the overlapping section of the first FOV based on anticipating movement of the viewer's head in the second angular direction such that the decrease is not directly correlated with head motion in time;

causing a decrease in the level of contribution to the blending from the overlapping section of the second FOV based on anticipating movement of the viewer's head in the first angular direction such that the decrease is not directly correlated with head motion in time; and causing an increase in the level of contribution to the blending from the overlapping section of the second FOV based on anticipating movement of the viewer's head in the second angular direction such that the increase is not directly correlated with head motion in time.

20. The method according to claim 13, further comprising:

delaying an increase in the level of contribution to the blending from the overlapping section of the first FOV as the viewer's head moves in the first angular direction such that the increase is not directly correlated with head motion in time;

delaying a decrease in the level of contribution to the blending from the overlapping section of the first FOV as the viewer's head moves in the second angular direction such that the decrease is not directly correlated with head motion in time;

delaying a decrease in the level of contribution to the blending from the overlapping section of the second FOV as the viewer's head moves in the first angular direction such that the decrease is not directly correlated with head motion in time; and delaying an increase in the level of contribution to the blending from the overlapping section of the second FOV as the viewer's head moves in the second angular direction such that the increase is not directly correlated with head motion in time.

* * * * *